US008380419B2

(12) United States Patent
Sauter

(10) Patent No.: US 8,380,419 B2
(45) Date of Patent: Feb. 19, 2013

(54) RESUME SPEED ADAPTATION FOR AUTOMATIC VEHICLE ACCELERATION AT A RATE DERIVED FROM A MEASURED ACCELERATION RATE

(75) Inventor: Ingo-Gerd Sauter, Meckenbeuren (DE)

(73) Assignee: ZF Friedrichshafen AG, Friedrichshafen (DE)

(*) Notice: Subject to any disclaimer, the term of this patent is extended or adjusted under 35 U.S.C. 154(b) by 635 days.

(21) Appl. No.: 12/413,228

(22) Filed: Mar. 27, 2009

(65) Prior Publication Data

US 2010/0250087 A1    Sep. 30, 2010

(51) Int. Cl.
*B60T 8/32* (2006.01)
(52) U.S. Cl. .......................... 701/93; 701/110
(58) Field of Classification Search .................. None
See application file for complete search history.

(56) References Cited

U.S. PATENT DOCUMENTS

| | | | | |
|---|---|---|---|---|
| 3,777,841 A * | 12/1973 | Thorner | ...................... | 180/172 |
| 4,849,892 A * | 7/1989 | McCombie | ..................... | 701/94 |
| 4,860,210 A * | 8/1989 | McCombie | ..................... | 701/93 |
| 4,890,231 A * | 12/1989 | Frantz | ............................. | 701/97 |
| 4,956,778 A * | 9/1990 | Naito | ............................... | 701/93 |
| 5,005,133 A * | 4/1991 | Takahashi | ..................... | 701/98 |
| 5,025,379 A * | 6/1991 | Etoh et al. | ....................... | 701/97 |
| 5,088,043 A * | 2/1992 | Akishino et al. | ................ | 701/93 |
| 5,154,250 A * | 10/1992 | Murai | ........................... | 180/179 |
| 5,155,687 A * | 10/1992 | Katayama | ....................... | 701/94 |
| 5,393,277 A * | 2/1995 | White et al. | ................... | 477/108 |
| 5,594,645 A * | 1/1997 | Nishimura et al. | .............. | 701/96 |
| 5,646,850 A * | 7/1997 | Ishida et al. | ..................... | 701/93 |
| 6,044,321 A * | 3/2000 | Nakamura et al. | .............. | 701/96 |
| 6,081,762 A | 6/2000 | Richardson et al. | | |
| 6,178,371 B1 | 1/2001 | Light et al. | | |
| 6,339,740 B1 * | 1/2002 | Seto et al. | ....................... | 701/96 |
| 7,069,136 B2 | 6/2006 | Assaf et al. | | |
| 7,236,871 B2 * | 6/2007 | Sah et al. | ......................... | 701/70 |
| 7,308,961 B2 * | 12/2007 | Satou et al. | .................... | 180/170 |
| 7,548,812 B2 * | 6/2009 | Guenthner et al. | ............. | 701/93 |
| 2005/0006165 A1 * | 1/2005 | Scherl et al. | ................... | 180/271 |
| 2009/0265072 A1 * | 10/2009 | Kondou et al. | ................. | 701/90 |

FOREIGN PATENT DOCUMENTS

| | | | |
|---|---|---|---|
| GB | 2283338 | * | 10/1993 |
| JP | 58029018 | * | 2/1983 |
| JP | 9207616 | * | 8/1997 |
| JP | 10250409 | * | 9/1998 |
| JP | 11011180 | * | 1/1999 |
| JP | 11020501 | * | 1/1999 |
| JP | 2000142165 | * | 5/2000 |
| WO | WO 95 10053 | | 4/1995 |

* cited by examiner

*Primary Examiner* — Mary Cheung
(74) *Attorney, Agent, or Firm* — Brinks Hofer Gilson & Lione

(57) ABSTRACT

A method and system of accelerating a vehicle from an intermediate speed to a target speed under control of a cruise control or driving speed control unit are disclosed. An acceleration rate of a vehicle is measured while a vehicle speed is below an intermediate speed at which the driving speed control unit is enabled. The intermediate speed is greater than the initial speed and less than the target speed. A derived acceleration rate is calculated using the measured acceleration rate. When the driving speed control unit is enabled, the vehicle is accelerated from the intermediate speed to the final speed at an acceleration rate about equal to the derived acceleration rate. The derived acceleration rate may be the acceleration rate of the vehicle at the intermediate speed, the average acceleration rate between the initial and intermediate speeds, or the average acceleration rate within a threshold of the intermediate speed.

20 Claims, 6 Drawing Sheets

RESUME SPEED ADAPTATION FOR AUTOMATIC VEHICLE ACCELERATION AT A RATE DERIVED FROM A MEASURED ACCELERATION RATE

TECHNICAL FIELD

This application relates generally to the operation of vehicle cruise control systems, and more specifically, to an adaptive resume speed function in a vehicle cruise control system.

BACKGROUND

Vehicles used for the transport of passengers, or for commercial traffic such as the transport of heavy cargo loads, often contain so-called driving speed control units, also called cruise control units, for increasing travelling comfort and improving the utility of the vehicle. Such units control or maintain the vehicle's speed during operation without the requiring the vehicle operator to actuate an accelerator pedal or a brake pedal. Control is achieved by obtaining the current speed and the requested target speed of the vehicle, and by varying an input torque of the prime mover of the vehicle, or by controlling vehicle braking system, in order to achieve or maintain the target speed.

In some systems, the operation of the driving speed control unit is interrupted by the driver's actuation of the brake pedal or accelerator pedal. In this case, the automatic vehicle speed control is terminated, and the driver may then adjust or maintain the speed of the vehicle through operation of the brake and accelerator controls. The driver may later relinquish control to the driving speed control unit, such as by sending a "Resume Speed" command to the driving speed control unit through a button or other control input. In some systems, the driving speed control unit will then adjust the vehicle speed to a previous vehicle speed, such as the speed of the vehicle when the driving speed control unit was disabled. Such a previous speed may be stored in the memory of the driving speed control unit for this purpose. The rate of acceleration used to reach the previous vehicle speed is often a predetermined value selected by the driving speed control unit without consideration of various vehicle operating conditions. As a result, travelling comfort can be reduced, and the risk of damaging cargo transported by the vehicle increases.

BRIEF SUMMARY

Therefore, it would be advantageous if the driving speed control unit could incorporate one or more vehicle operating conditions when calculating the acceleration rate used to restore a vehicle to a previous speed after enabling the driving speed control unit. Specifically, a driving speed control unit that incorporates recent vehicle acceleration rate information may reduce or avoid the discontinuity in acceleration rate associated with transferring control of the acceleration of the vehicle from the driver to the driving speed control unit.

In one embodiment, there is a method of changing a speed of a vehicle from an initial speed value to a final speed value. A measured acceleration rate of the vehicle is determined while a vehicle speed is below an intermediate speed value, where the intermediate speed value is greater than the initial speed value and less than the final speed value. A derived acceleration rate is calculated from the measured acceleration rate. An enable input is received when the vehicle speed is about equal to the intermediate speed value. The vehicle is automatically accelerated from the intermediate speed value to the final speed value at an acceleration rate about equal to the derived acceleration rate. In one implementation, the derived acceleration rate is set to a minimum acceleration rate value if the measured acceleration rate is less than the minimum acceleration rate value. In another implementation, the derived acceleration rate is set to a maximum acceleration rate value if the measured acceleration rate is greater than the maximum acceleration rate value. In one implementation, the measured acceleration rate is determined by averaging the acceleration rate of the vehicle between the initial speed value and the intermediate speed value. In another implementation, the measured acceleration rate is determined by averaging the acceleration rate of the vehicle between a threshold speed of the intermediate speed value and the intermediate speed value. In yet another implementation, the measured acceleration rate is determined by measuring an acceleration rate of the vehicle when the vehicle speed is at about the intermediate speed value.

In another embodiment, there is a cruise control system for a vehicle. The cruise control system includes a throttle, a vehicle speed sensor, an enable input, and a controller in communication with the throttle, the vehicle speed sensor and the enable input. The controller can receive an enable signal from the enable input to maintain the speed of the vehicle at a final speed value. The controller can also determine a measured acceleration rate of the vehicle when a vehicle speed is below an intermediate speed value that is greater than an initial speed value and less than the final speed value. The controller can calculate a derived acceleration rate from the measured acceleration rate, determine that a speed of the vehicle is about equal to the intermediate speed value, and automatically transmit an acceleration signal to the throttle to accelerate the vehicle from the intermediate speed value to the final speed value at an acceleration rate about equal to the derived acceleration rate. In one implementation, the derived acceleration rate is set to a minimum acceleration rate value if the measured acceleration rate is less than the minimum acceleration rate value. In another implementation, the derived acceleration rate is set to a maximum acceleration rate value if the measured acceleration rate is greater than the maximum acceleration rate value. In one implementation, the measured acceleration rate is determined by averaging the acceleration rate of the vehicle between the initial speed value and the intermediate speed value. In another implementation, the measured acceleration rate is determined by averaging the acceleration rate of the vehicle between a threshold speed of the intermediate speed value and the intermediate speed value. In yet another implementation, the measured acceleration rate is determined by measuring an acceleration rate of the vehicle when the vehicle speed is at about the intermediate speed value.

In another embodiment, a vehicle is disclosed. The vehicle includes a prime mover, a transmission that can couple power from the internal combustion engine to a transmission output at one or more different gear ratios, a throttle that can control a rotational speed of an internal combustion engine, a vehicle speed sensor, an enable input, and a controller. The controller can communicate with the throttle, the vehicle speed sensor and the enable input, and can select a gear ratio of the transmission, receive an enable signal from the enable input to maintain the speed of the vehicle at a final speed value. The controller can also determine a measured acceleration rate of the vehicle while a vehicle speed is below an intermediate speed value, where the intermediate speed value is greater than an initial speed value and less than the final speed value, calculate a derived acceleration rate from the measured acceleration rate, determine that a speed of the vehicle is about equal to the intermediate speed value, and transmit an acceleration signal to the throttle to accelerate the vehicle from the intermediate speed value to the final speed value at an acceleration rate about equal to the derived acceleration rate. In one implementation, the derived acceleration rate is set to a minimum acceleration rate value if the measured acceleration rate is less than the minimum acceleration rate value. In another implementation, the derived acceleration rate is set to a maximum acceleration rate value if the measured acceleration rate is greater than the maximum acceleration rate value.

Other embodiments, features, and advantages thereof are possible and will be, or will become, apparent to one with skill in the art upon examination of the following figures and detailed description. Hence, it is intended that the scope of the claimed invention as recited in the claims below will not be limited to the embodiments shown and described herein.

DETAILED DESCRIPTION OF THE DRAWINGS AND THE PRESENTLY PREFERRED EMBODIMENTS

While a vehicle operator may directly control the acceleration and deceleration of a vehicle such as a passenger car or truck, some vehicles are provided with a driving speed control unit to maintain the speed of the vehicle at a target speed, or to restore the speed of a vehicle to a target speed. These driving speed control units may increase the convenience and utility of the vehicle. If a driving speed control unit is utilized to automatically accelerate a vehicle from an intermediate speed to a final or target speed, the acceleration rate for this operation must be determined. In some systems, this acceleration rate is a predetermined value, possibly selected by the driving speed control unit from a set of fixed values. When control of the acceleration of the vehicle is transferred from the vehicle operator to the driving speed control unit, there may be a discontinuity in the acceleration rate if the current acceleration rate determined by the operator is not equal to the acceleration rate selected by the driving speed control unit. A rapid change in acceleration rate may be undesirable when the driving speed control unit is engaged, because it may damage cargo or vehicle drivetrain components, and may lead to discomfort of the passengers or vehicle operator. A driving speed control unit that minimizes the change in acceleration rate when engaged, such as by selecting an acceleration rate based on the current or a recent acceleration rate, may avoid these problems. Such a driving speed control unit system and method are explained in further detail below through the figures and accompanying text.

Figure 1:
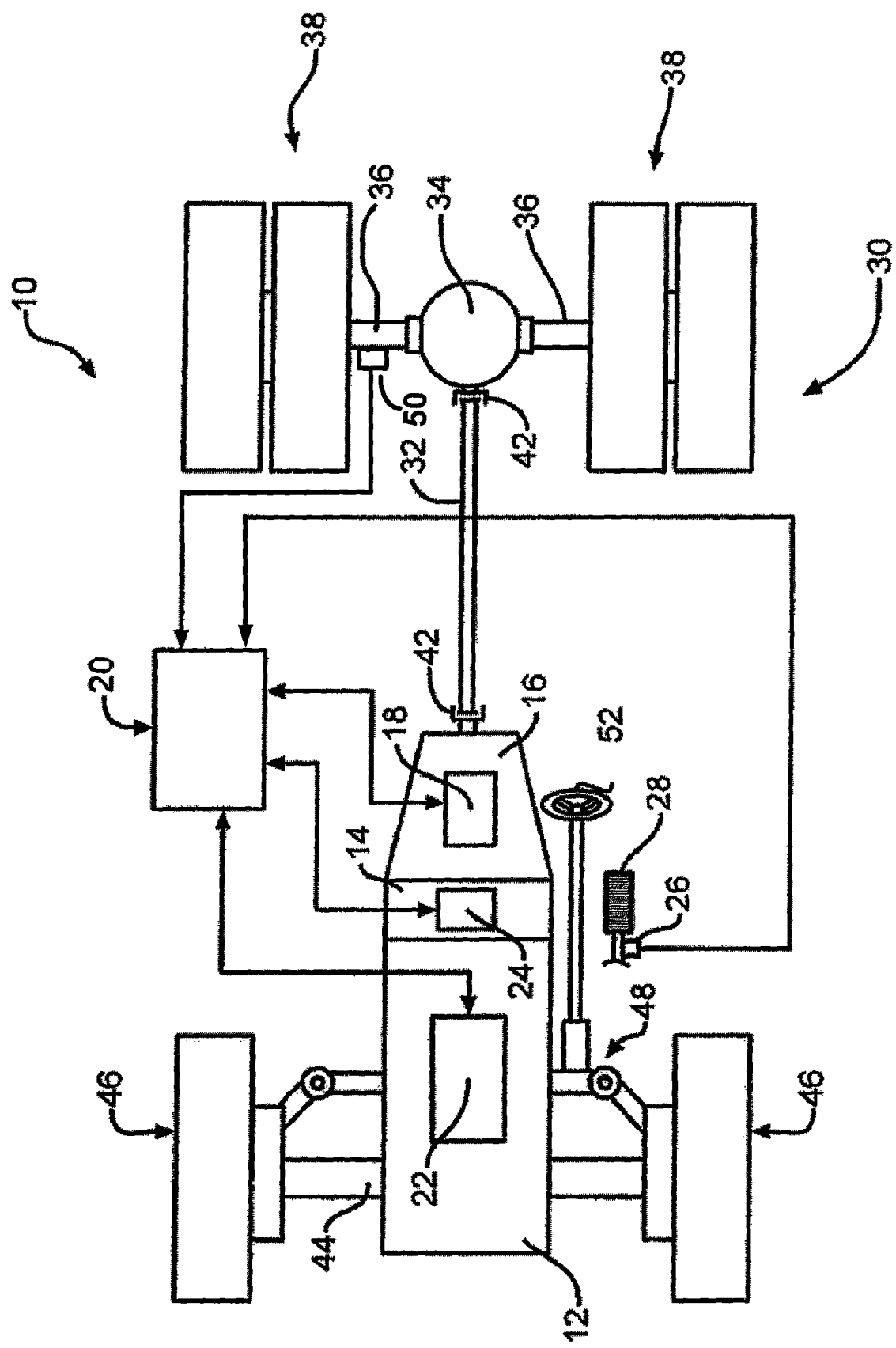
FIG. 1 is a diagram illustrating an exemplary vehicle incorporating a driving speed control unit.

FIG. 1 is a diagram illustrating an exemplary vehicle incorporating a driving speed control unit. A vehicle 10 includes a prime mover 12 which may be an internal combustion gas, natural gas, or diesel engine. In some embodiments, the prime mover 12 is an electric motor. In other embodiments, the prime mover 12 may be a combination of any two power sources, such as an electric motor and an internal combustion engine, that individually or cooperatively provide power to move the vehicle 10. Vehicles containing two or more power sources are often referred to as hybrid vehicles. The output of the prime mover 12 may be provided directly to a master friction clutch 14. The master friction clutch 14 selectively and positively engages the output of the prime mover 12 to an input of a multiple speed gear change transmission 16. The transmission 16 may be of the type currently referred to as an automated mechanical transmission (AMT) wherein gear or speed ratio changes of a main transmission, a splitter and a planetary gear assembly, for example, are all achieved by an automated, i.e., electric, hydraulic or pneumatic, shift and actuator assembly 18 under the control of a master microprocessor or controller 20.

While not shown in FIG. 1, in another embodiment, the output of a prime mover 12 may be provided directly to a hydrodynamic torque converter. The hydrodynamic torque converter may in turn provide a fluid coupling, based on a slip effect, to transmit power to the input of an automatic transmission. The torque converter may be equipped with a lockup clutch to selectively and positively engage the output of the prime mover 12 to an input of the automatic transmission to improve power transmission efficiency in certain driving conditions. The automatic transmission may include planetary gear sets that are shifted by means of frictional or shifting elements, for example clutches and brakes. The gear or speed ratio changes of the automatic transmission are all achieved by an automated, i.e., electric, hydraulic or pneumatic, shift and actuator assembly 18 under the control of a master microprocessor or controller 20.

The master microprocessor or controller 20 also includes a data and control link to an engine controller 22 which will typically include an engine speed sensor and a fuel control or metering device, such as a throttle, capable of adjusting and controlling the speed of the prime mover 12. In one embodiment, the controller 20 includes a driving speed control unit to adjust or maintain the speed of the vehicle 10. The master controller 20 may also provide control signals to a master friction clutch operator assembly 24 which controls the engagement and disengagement of the master friction clutch 14. A throttle position sensor 26 senses the position of a vehicle throttle or accelerator pedal 28 and may provide real time data regarding the position of the throttle pedal 28 to the master controller 20. A vehicle speed sensor 50 may provide an input indicative of the number of revolutions of the axle 36 (and thus the wheels 38) per unit of time, which may be used by the master controller 20 to compute the real-time speed of the vehicle 10. The master microprocessor or controller 20 and all of its components may be implemented in hardware, such as circuitry suitable to implement the functionality as described below, software (software includes firmware), or a combination of hardware and software.

The output of the transmission 16 is provided to a driveline assembly 30, including a propshaft 32 that drives a differential 34. The differential 34 provides drive torque to a pair of axles 36 which are in turn coupled to rear left and right tire and wheel assemblies 38 which may be either a dual configuration as illustrated or a single left and right tire and wheel assembly. Suitable universal joints 42 may be utilized as necessary with the rear propshaft 32 to accommodate static and dynamic offsets and misalignments thereof. An axle 44 pivotally supports a pair of front tire and wheel assemblies 46 which are controllably pivoted by a steering linkage 48 which is coupled to and positioned by a steering wheel 52. Other embodiments of the vehicle 10 are also possible, including configurations where the front tire and wheel assemblies 46 are driven by the prime mover 12 through the driveline assembly 30 and the rear left and right tire and wheel assemblies 38 are not driven, and configurations where all of the wheels 46 and 38 are driven by the prime mover 12 through the driveline assembly 30.

As mentioned previously, a controller 20 may incorporate or be in communication with driving speed control unit to adjust or maintain the speed of the vehicle 10. While a variety of implementations are possible, many driving speed control units accept some or all of the following inputs from the driver, typically in the form of push-button actuators or switches:

ON: Enable the driving speed control (cruise control) unit.

OFF: Disable the driving speed control unit. Direct control of the speed of the vehicle (through accelerator or brake inputs) returns to the driver. In some vehicles, the driving speed control unit may also be disabled by depressing the vehicle brake pedal, activating an emergency brake, or activating an engine brake or exhaust brake.

SET: Establish the current vehicle speed as the target speed to be maintained by the driving speed control unit (when enabled), or achieved by the driving speed control unit when the RESUME input is given by the driver at a later time.

COAST: Direct the driving speed control unit to reduce the current vehicle speed by a given ramp, usually by adjusting the fuel control or metering device to reduce the speed of the prime mover 12. In some implementations, the vehicle speed is reduced by a certain increment (such as 1 km/h) for each input (button press) received from the driver. In other embodiments, deceleration occurs as long as the driver selects the COAST input (depresses the COAST button).

ACCEL: Direct the driving speed control unit to increase the current vehicle speed by a given ramp, usually by adjusting the fuel control or metering device to increase the speed of the prime mover 12. In some implementations, the vehicle speed is increased by a certain increment (such as 1 km/h) for each input (button press) received from the driver. In other embodiments, deceleration occurs as long as the driver selects the ACCEL input (depresses the ACCEL button). In either implementation, the new vehicle speed may be established as the target speed to be maintained by the driving speed control unit.

RESUME: Directs the driving speed control unit to resume the last vehicle speed stored with the SET function. In some embodiments, the RESUME button can also enable the driving speed control unit if it was recently disabled.

In many vehicles, the driving speed control unit is only operable if the vehicle speed is above a minimum. If a driver decelerates one of these vehicles below a minimum speed, such as when stopping the vehicle at a traffic signal, the driving speed control unit no longer controls the vehicle speed, and does not respond to RESUME, ACCEL, SET, or ON inputs. Thus, the driver is responsible for the direct control of the vehicle speed when the vehicle speed is below this minimum. When accelerating, the driver must control the speed of the vehicle until the vehicle reaches a minimum speed. At or above this speed, the driver may enable the driving speed control unit, and optionally, send a RESUME input to the driving speed control unit to accelerate the vehicle to a previously stored vehicle speed value.

Figure 2:
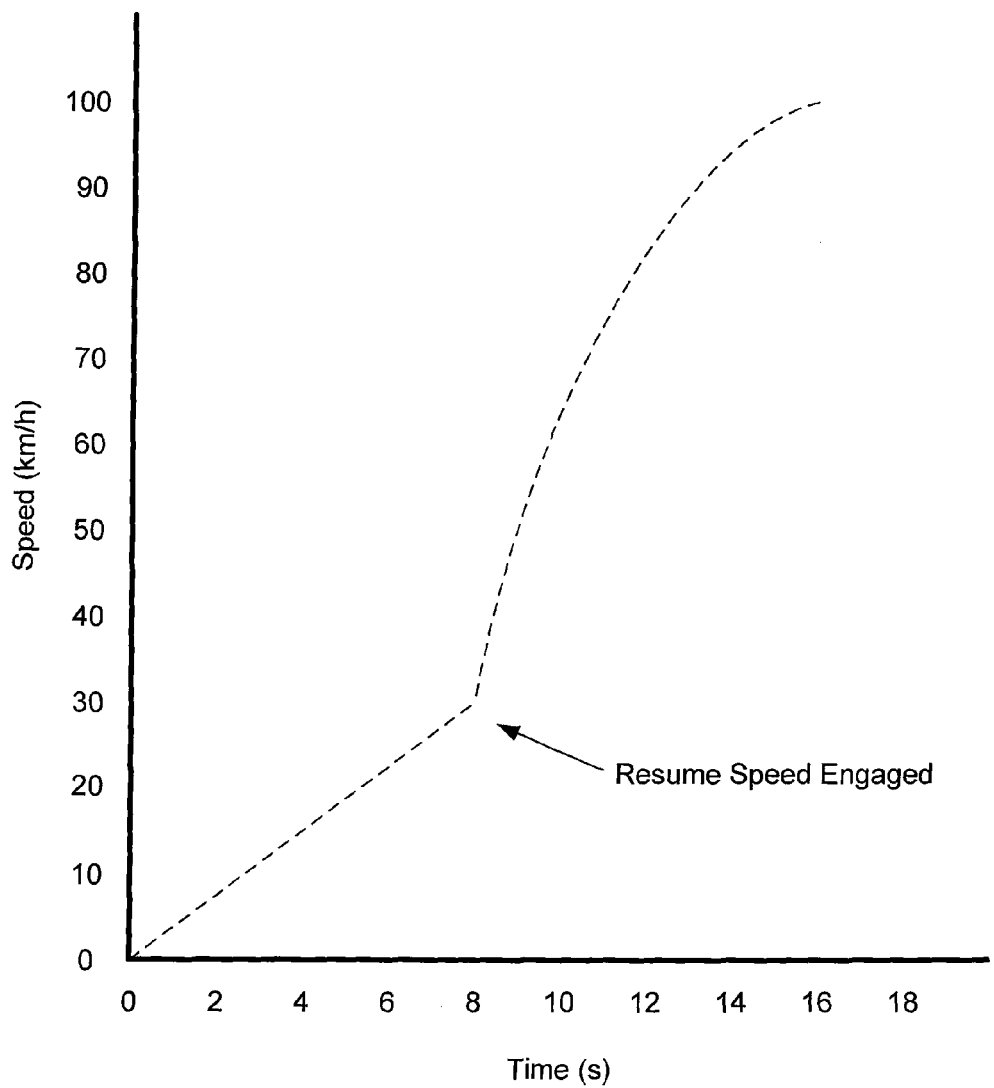
FIG. 2 illustrates an exemplary vehicle acceleration curve with a driving speed control unit enabled.

When a RESUME input is accepted by the driving speed control unit, the driving speed control unit assumes control of the acceleration of the vehicle to the target or final speed. Thus, the control of the vehicle acceleration rate transfers from manual (driver) control to automatic (driving speed control unit) control. In some systems, this transfer of control may result in a change of the rate of acceleration of the vehicle. FIG. 2 illustrates an exemplary vehicle acceleration curve with a driving speed control unit enabled. In the figure, the driver accelerates the vehicle 10 from 0 km/h to 30 km/h in approximately eight seconds, which corresponds to an acceleration rate of approximately 1.04 m/s$^2$. At eight seconds, the driving speed control unit is engaged to accelerate the vehicle from 30 km/h to 100 km/h. In this example, it is assumed that 30 km/h is above the minimum speed at which the driving speed control unit can be engaged, such as by receiving a RESUME input from the driver. In one embodiment, the 100 km/h target speed is stored by the driving speed control unit in response to a previously received SET command. Under control of the driving speed control unit, the vehicle is accelerated from 30 km/h to 50 km/h in one second, which indicates an acceleration rate of approximately 5.56 m/s$^2$. In one embodiment, the acceleration rate may be a predetermined value, such as a throttle control or fuel control or metering device setting, selected by the driving speed control unit to change the vehicle speed to a target speed. The ultimate vehicle acceleration rate may be limited by the performance characteristics of the prime mover 12, gear ratios of the transmission 16, or other components of the drivetrain assembly 30. For example, FIG. 2 shows a decaying acceleration rate as the vehicle 10 approaches 100 km/h. The rapid increase in acceleration rate when the driving speed control unit is engaged may be undesirable for several reasons, as it may damage drivetrain components, shift cargo, or increase the discomfort of vehicle passengers.

Figure 3:
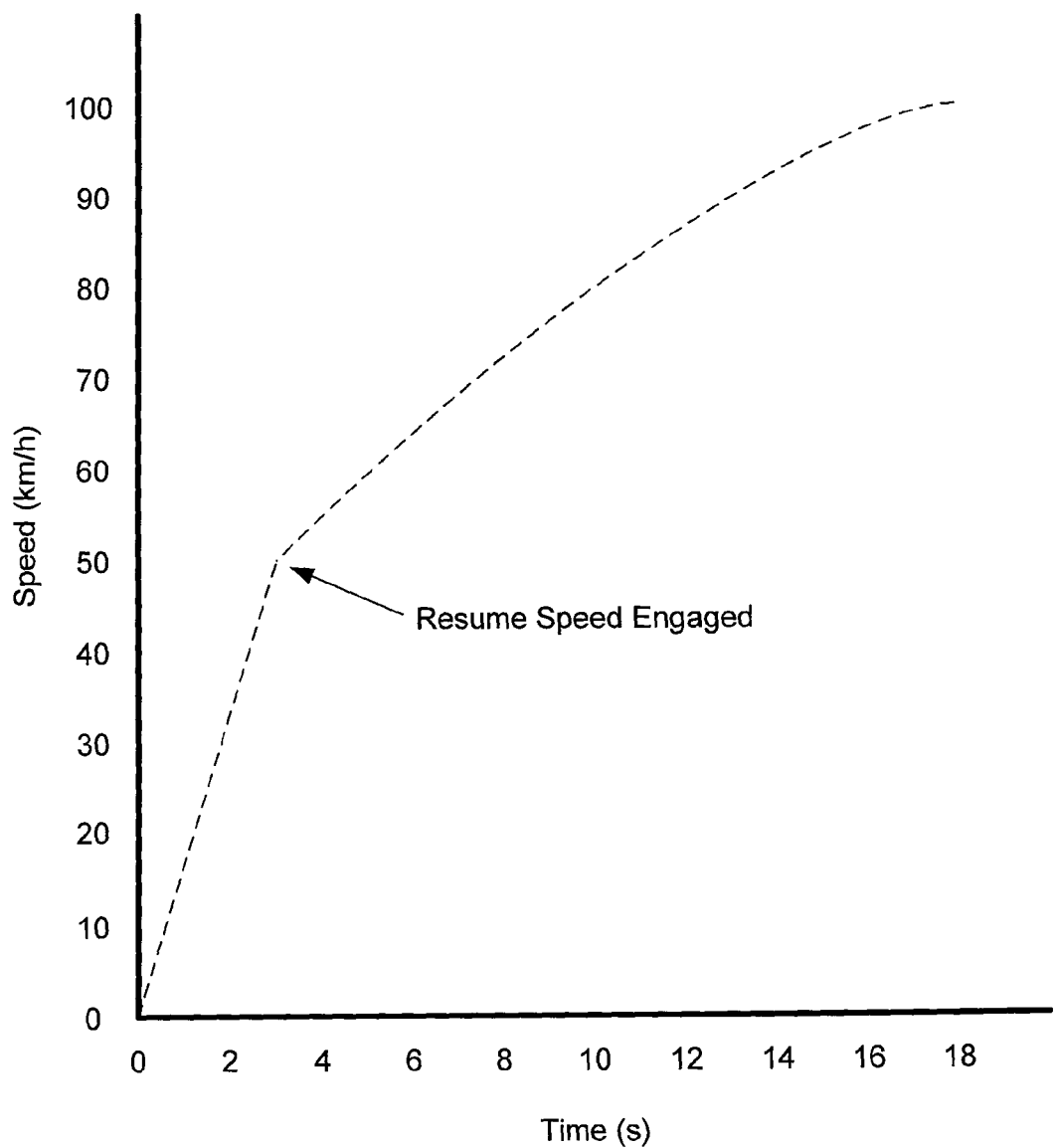
FIG. 3 illustrates an exemplary vehicle acceleration curve when a driving speed control unit is enabled.

FIG. 3 illustrates another exemplary vehicle acceleration curve when a driving speed control unit is enabled. In the figure, the driver accelerates the vehicle 10 from 0 km/h to 50 km/h in approximately three seconds, an acceleration rate of approximately 4.63 m/s$^2$. At three seconds, the driving speed control unit is engaged to accelerate the vehicle from 50 km/h to 100 km/h. In this example, it is assumed that 50 km/h is above the minimum speed at which the driving speed control unit can be engaged, and that 100 km/h is the target speed stored by the driving speed control unit. Under control of the driving speed control unit, the vehicle is accelerated from 50 km/h to 60 km/h in two seconds, which indicates an acceleration rate of 1.39 m/s$^2$. In one embodiment, the acceleration rate may be a predetermined value selected by the control unit to accelerate the vehicle speed to a target speed. This rapid reduction in acceleration rate when the driving speed control unit is engaged may be undesirable for several reasons, as it may damage drivetrain components, cause cargo to shift, or cause discomfort for vehicle passengers.

The discontinuity in acceleration rates shown in FIGS. 2 and 3 may occur when a driving speed control unit selects an acceleration rate that is independent of driving conditions, such as the acceleration rate of the vehicle before the RESUME input is received. A driving speed control unit may avoid or reduce the abrupt change in acceleration rate shown in FIGS. 2 and 3 by measuring an acceleration rate before the RESUME input is received. When the driving speed control unit is enabled (by receiving a RESUME input), the driving speed control unit accelerates the vehicle to the target speed at approximately the measured acceleration rate. Doing so may reduce the abrupt change in acceleration rate that occurs when control is transferred to the driving speed control unit. Additionally, the driving speed control unit accelerates the vehicle to the target speed at a rate similar to the rate that the driver selected in accelerating the vehicle before the RESUME input was received.

Figure 4:
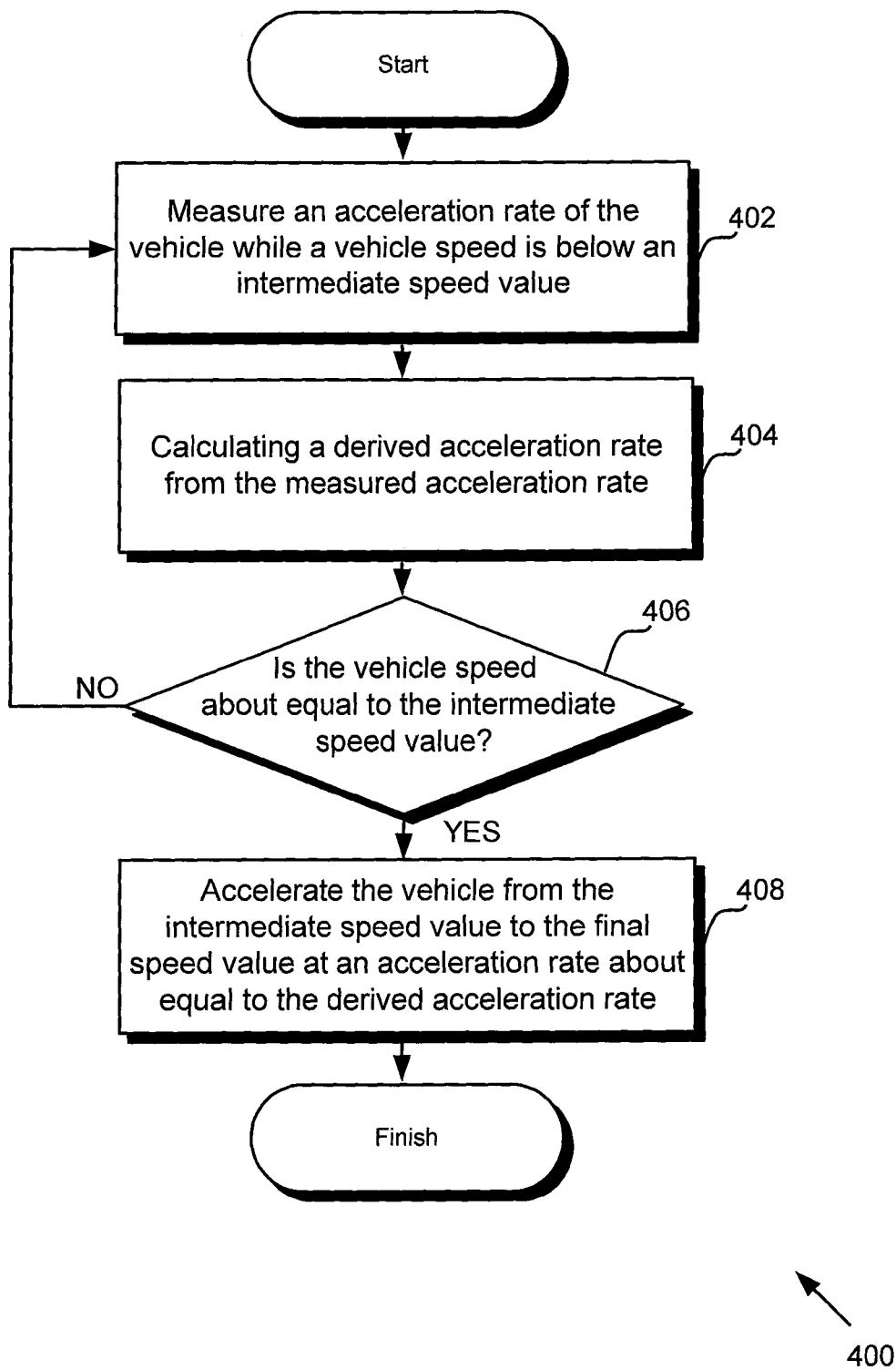
FIG. 4 shows exemplary steps for accelerating a vehicle from an intermediate speed to a target speed according to an embodiment.

FIG. 4 shows exemplary steps for accelerating a vehicle from an intermediate speed to a target speed according to an embodiment. It is assumed that the vehicle 10 is traveling below the intermediate speed value before the steps 400 begin. The intermediate speed is the vehicle speed at which the driving speed control unit is enabled, either by receiving a RESUME or other enabling input from the driver when the vehicle speed is above a minimum value where the driving speed control unit is operable, or by an automatic enabling of the driving speed control unit when the vehicle speed has exceeded a minimum value where the driving speed control unit is operable. Control begins at step 402, where an acceleration rate of the vehicle is measured while the vehicle speed is below the intermediate speed value.

Figure 6:
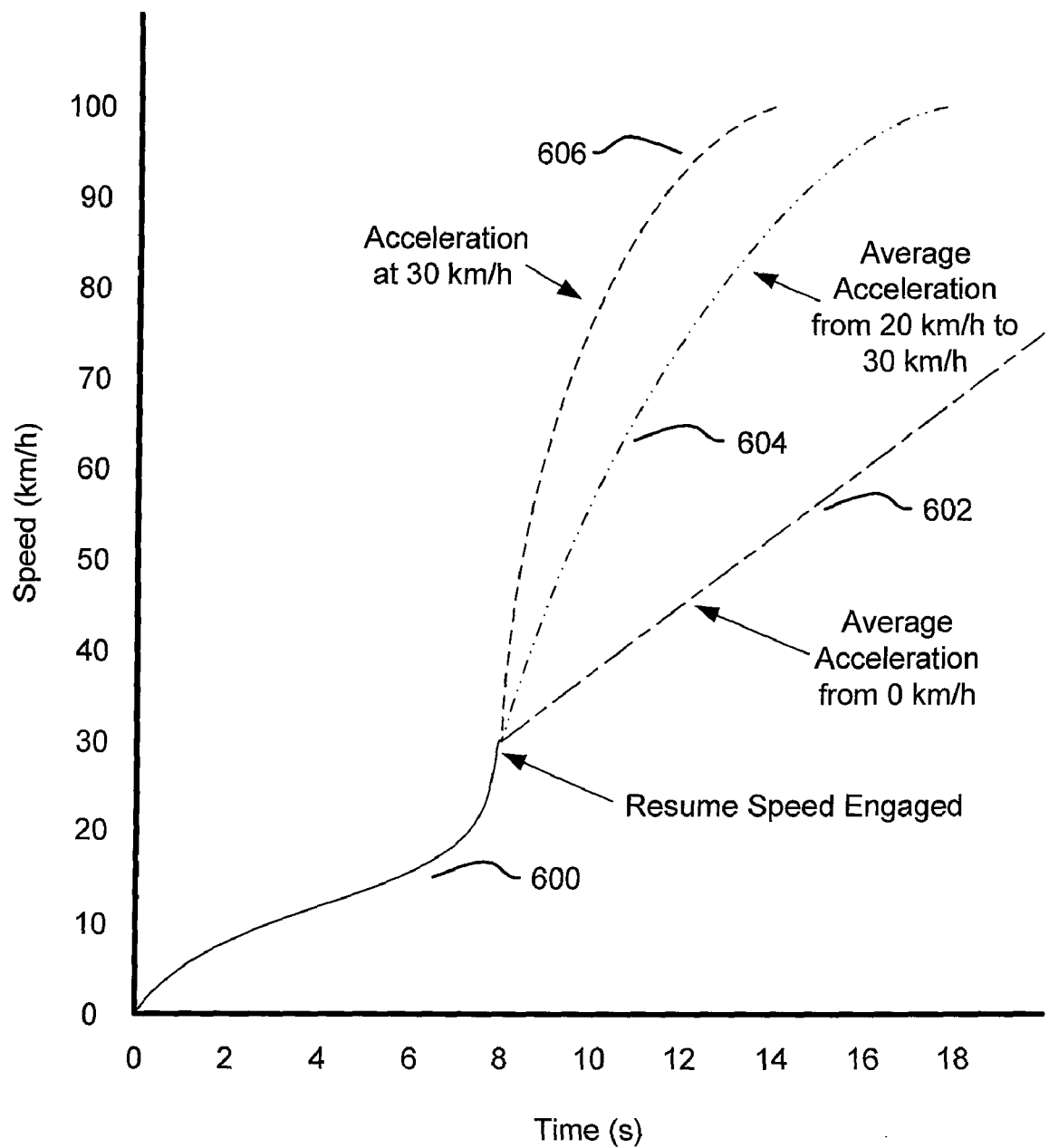
FIG. 6 illustrates exemplary vehicle acceleration curves when a driving speed control unit is enabled according to an embodiment.

The measured acceleration rate may be determined using a variety of algorithms. In one embodiment, the measured acceleration rate is the average acceleration rate of the vehicle as it accelerates from 0 km/h to the intermediate speed. In another embodiment, the measured acceleration rate is the average acceleration rate of the vehicle when the vehicle is within a threshold of the intermediate speed. For example, if the intermediate speed value is 30 km/h, then the derived acceleration rate may be the average acceleration rate of the vehicle between about 20 km/h and 30 km/h. In another example, the threshold speed may be closer to the intermediate speed, such as 25 km/h, so that the measured acceleration rate is based on the average acceleration rate of the vehicle as it travels between 25 km/h and 30 km/h. In yet another embodiment, the measured acceleration rate is approximately equal to the instantaneous rate of acceleration calculated when the vehicle speed is at about the intermediate speed. FIG. 6 and the accompanying text provide a comparison of the acceleration curves resulting from operation of these algorithms. Other algorithms for calculating a measured acceleration rate are also possible.

Control passes to step 404, where a derived acceleration rate is calculated from the measured acceleration rate. In one embodiment, the derived acceleration rate may be updated with the measured acceleration rate value when the vehicle is approximately equal to the intermediate vehicle speed.

In one embodiment, the derived acceleration rate calculated in step 404 may be set to ensure that it is not less than a minimum value. This may be desirable, for example, to allow the vehicle 10 accelerate to a target speed at a minimum rate that does not impede the flow of traffic on a roadway. In this embodiment, the measured acceleration rate is compared to a minimum acceleration rate. If the measured acceleration rate is less than the minimum acceleration rate, then the derived acceleration rate is set to the minimum acceleration rate.

In one embodiment, the derived acceleration rate calculated in step 404 may be set to ensure that it is not more than a maximum value. This may be desirable, for example, to facilitate safe operation of the vehicle 10, or to avoid wheel slip on low traction surfaces, or to improve fuel economy. In this embodiment, the measured acceleration rate is compared to a maximum acceleration rate. If the measured acceleration rate is greater than the maximum acceleration rate, then the derived acceleration rate is set to the maximum acceleration rate.

Control passes to step 406, where the vehicle speed is compared to the intermediate speed value. If the vehicle speed is below the intermediate speed value, then the driving speed control unit has not been enabled yet, and control passes back to step 402 in order to continue taking acceleration measurements and calculating the derived acceleration rate. If the vehicle speed is approximately equal to or greater than the intermediate speed value and the driving speed control unit has been enabled (either manually, such as by the driver or automatically, such as when the vehicle speed is above a minimum value), then control passes to step 408. At step 408, the vehicle is accelerated from the intermediate speed value to the final or target speed value at an acceleration rate about equal to the derived acceleration rate. The master microprocessor 20, under direction of the driving speed control unit, may adjust the fuel control or metering device to control the speed of the prime mover 12 in order to achieve the derived acceleration rate. The actual acceleration rate of the vehicle may be limited by performance or other characteristics of the prime mover 12, the transmission 16, or other components of the vehicle drivetrain 30. Similarly, the actual acceleration rate may be limited by environmental conditions, such as the grade of the surface on which the vehicle is travelling (such as uphill, flat, or downhill), the weight of the cargo being carried, pulled, or pushed by the vehicle, and the traction available to the driving wheels of the vehicle.

Figure 5:
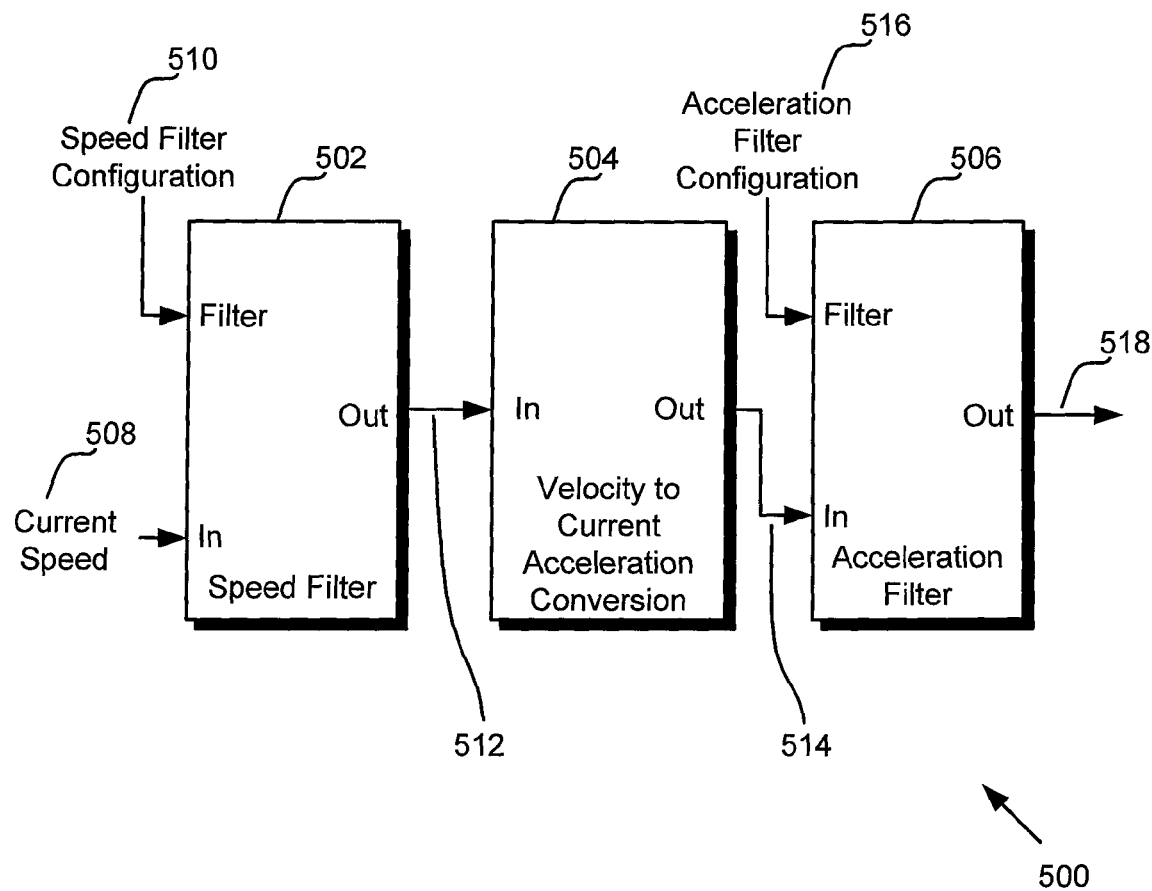
FIG. 5 illustrates an exemplary block diagram for a subsystem that determines the measured acceleration of the vehicle according to an embodiment.

In order to perform the steps 400 to calculate a derived acceleration value, the controller 20 or the driving speed control unit may require access to a value indicative of the current acceleration rate of the vehicle 10, or be able to determine the current acceleration of the vehicle. FIG. 5 illustrates an exemplary block diagram for a subsystem 500 that determines the measured acceleration of the vehicle according to an embodiment. The subsystem 500 includes a vehicle speed filter 502, a current acceleration module 504, and an acceleration filter 506. The subsystem 500 and each of its components may be implemented in hardware, software, or any combination of hardware and software. The subsystem 500 may be a component of the controller 20 or the driving speed control unit.

The vehicle speed filter 502 generates a filtered vehicle speed 512 that may reduce the effect of possible aberrations or discontinuities in the measured vehicle speed 508. The vehicle speed filter 502 accepts an input 508 indicative of the current speed of the vehicle, and a speed filter configuration input 510. In one embodiment, the current speed input 508 may be driven by a sensor 50 that indicates the number of revolutions per unit of time at a wheel 38 or an axle 36 of the vehicle 10, or provides an indication that the wheel or axle has completed a revolution. In another embodiment, the current speed input 508 is readily obtained from an existing measured value indicative of vehicle speed. For example, the input 508 to the vehicle speed filter 502 may include wheel speed values utilized by anti-lock braking (ABS) systems, vehicle speed inputs used by tachographs, transmission 16 output shaft speeds, or other speed values, such as may be transmitted over a vehicle Controller Area Network (CAN) bus in accordance with standards such as the SAE J1939-71 standard. The speed filter configuration input 510 may be used to configure the vehicle speed filter 502 that accepts the vehicle speed input 508 and generates the filtered vehicle speed 512. The speed filter configuration input 510 may depend on the type of filtering algorithm used. For example, the speed filter configuration input 510 may indicate the number of samples of the vehicle speed input 508 that should be used to calculate the filtered vehicle speed 512, such as an average of the samples, or a weighted average of the samples. In another embodiment, the speed filter configuration input 510 may include the duration of time that the vehicle speed input 508 should be sampled when calculating the filtered vehicle speed 512. In another embodiment, the speed filter configuration input 510 may allow the vehicle speed filter to discard potentially erroneous or aberrant sample values, such as wheel speed measurements taken while a vehicle wheel loses traction or slips. The speed filter configuration input 510 may be a predetermined input, or may be adjusted by the controller 20 during operation of the vehicle 10. Other circuits or algorithms suitable to produce a filtered vehicle speed may also be used.

The filtered vehicle speed 512 may be used as an input to the current acceleration module 504. The current acceleration module 504 determines the current vehicle acceleration 514, such as by determining the change in the filtered vehicle speed 512 as a function of time. The current vehicle acceleration 514 may be filtered by the acceleration filter 506 to determine the filtered acceleration rate 518.

The purpose of acceleration filter 506 may be similar to the vehicle speed filter 502, to reduce the effect of possible aberrations, discontinuities, or errors in the derived acceleration 514. The acceleration filter configuration input 516 may be used to configure the acceleration filter 506, and may depend on the type of filtering algorithm used. For example, the acceleration filter configuration input 516 may indicate the number of samples of the derived acceleration 514 that should be used to calculate the filtered acceleration rate 518, such as an average of the samples, or a weighted average of the samples. In another embodiment, the acceleration filter configuration input 516 may include the duration of time that the derived acceleration rate 514 should be sampled when calculating the filtered acceleration rate 518. In another embodiment, the acceleration filter configuration input 516 may allow the acceleration filter 506 to discard potentially erroneous or aberrant sample values, such as acceleration values derived when a vehicle wheel loses traction. The acceleration filter configuration input 516 may be a predetermined input, or may be adjusted by the controller 20 during operation of the vehicle 10.

The filtered acceleration rate 518 may be used to calculate a measured acceleration rate that the driving speed control unit of the controller 20 may use to accelerate the vehicle from an intermediate speed value, such as the vehicle speed when the driving speed control unit is enabled with a received RESUME input, to a target or final speed value, such as the speed value stored by the driving speed control unit in response to receiving a SET input. As stated above, a variety of algorithms may be utilized to calculate a measured acceleration rate. FIG. 6 illustrates exemplary vehicle acceleration curves when a driving speed control unit is enabled according to an embodiment. FIG. 6 shows an acceleration of a vehicle from 0 km/h to an intermediate speed value of 30 km/h, where the driving speed control unit is enabled in response to receiving a RESUME input. Three exemplary acceleration curves 602, 604, and 606 illustrate the acceleration of the vehicle above 30 km/h according to a derived acceleration rate calculated using three exemplary algorithms. The acceleration curves 602, 604, and 606 differ because of differences in the algorithms used to calculate the derived acceleration rate used to accelerate the vehicle from 30 km/h to 100 km/h, the target or final speed value.

In one embodiment, shown by a first acceleration curve 602, the measured acceleration rate is the average filtered acceleration rate 518 of the vehicle as the vehicle accelerates from 0 km/h to the intermediate speed of 30 km/h. Because the acceleration curve 600 of the vehicle from 0 km/h to 30 km/h is not linear, a derived acceleration rate calculated with this method results in a relatively large discontinuity in acceleration rate at 30 km/h when the driving speed control unit is engaged.

In another embodiment, shown by a second acceleration curve 604, the measured acceleration rate is the average filtered acceleration rate 518 of the vehicle when the vehicle 10 is within a threshold of the intermediate speed. In this example, the measured acceleration rate may be the average acceleration rate of the vehicle between about 20 km/h and 30 km/h. As compared with the first acceleration curve 602, the discontinuity in acceleration rate at the point where the driving speed control unit is disabled is relatively smaller. The acceleration curve above 30 km/h may not be linear because of the performance characteristics of the vehicle, such as the transmission 16 gear ratio at a given vehicle speed, and the power generated by the prime mover 12 at a certain engine speed.

In yet another embodiment, shown by a third acceleration curve 604, the measured acceleration rate is approximately equal to the instantaneous rate of acceleration calculated when the vehicle speed is at the intermediate speed. As compared with the first acceleration curve 602 and the second acceleration curve 604, this results in the smallest discontinuity in acceleration at 30 km/h, when the driving speed control unit is engaged. On the other hand, because of the relatively high acceleration rate of the vehicle as it approaches 30 km/h in the example shown in FIG. 6, this algorithm also results in the highest acceleration rate of the vehicle from 30 km/h to the target speed of 100 km/h, which may be unsafe or undesirable for a variety of reasons, such as if the vehicle is being operated on a road surface with limited traction or if poor weather conditions exist. Such a high acceleration rate may result in poor fuel economy. If the measured acceleration rate is above a maximum rate value, the derived acceleration rate may be capped to a maximum rate value in order to avoid accelerating the vehicle at a rate that is unsafe or uneconomical. As is the case for the second acceleration curve, the third acceleration curve 606 may not be linear between 30 km/h and 100 km/h because of the performance characteristics of the vehicle 10.

Returning briefly to FIG. 2, if the acceleration rate below 30 km/h is approximately linear, the three exemplary algorithms shown in the first, second, and third acceleration curves 602, 604, and 606 would yield approximately the same results, and would reduce the discontinuity in acceleration rate at 30 km/h, where the driving speed control unit is enabled. Hence, the non-linear acceleration curve 600 below 30 km/h shown in FIG. 6 is useful to demonstrate the relative differences between the possible algorithms that may be used to calculate a derived acceleration rate from the measured acceleration rate 518. It should be noted that FIG. 6 illustrates three exemplary algorithms, but other algorithms utilizing acceleration rates below the intermediate speed to determine the derived acceleration rate are also possible.

Referring back to FIG. 1, a master controller 20 may incorporate or be in communication with a driving speed control unit that implements the steps 400 that may reduce the discontinuity in acceleration rate that may occur when the driving speed control unit is enabled in order to accelerate a vehicle 10 to a target speed. Instead of using a fixed or predetermined acceleration rate to increase the vehicle speed to the target speed, as illustrated in FIGS. 2 and 3, a driving speed control unit implemented in accordance with an embodiment may measure the acceleration of the vehicle as it approaches an intermediate speed where the driving speed control unit is enabled. The driving speed control unit may use at least some of these acceleration measurements to calculate a derived acceleration rate. This derived acceleration rate will be used to accelerate the vehicle to the target speed when the driving speed control unit is enabled. By selecting an acceleration rate that is takes into account the current vehicle operating conditions, the performance of the vehicle 10 under partial control of the driving speed control unit more closely matches the driver's expectations. An abrupt shift in the acceleration rate when the driving speed control unit is enabled is thus avoided. This may reduce the possibility of load shifting that may damage the cargo being transported, pulled, or pushed by the vehicle 10. Reducing the discontinuity in acceleration rate may also avoid damage to components of the vehicle driveline 30, such as the transmission 16, propshaft 32, universal joints 42, differential 34 or axles 36, and may result in improved fuel efficiency.

Although the invention has been described with respect to various system and method embodiments, it will be understood that the invention is entitled to protection within the full scope of the appended claims.

The invention claimed is:

1. A method of changing a speed of a vehicle from an initial speed value to a final speed value, comprising:
    determining a measured acceleration rate of the vehicle while a vehicle speed is below an intermediate speed value and prior to receiving a resume command from an operator to automatically accelerate the vehicle from the intermediate speed value to the final speed value, wherein the intermediate speed value is greater than the initial speed value and less than the final speed value;
    calculating a derived acceleration rate from the measured acceleration rate;
    receiving the resume command from an operator when the vehicle speed is equal to or greater than the intermediate speed value, wherein the resume command is indicative of an instruction to commence automatically accelerating the vehicle from the intermediate speed value to the final speed value; and
    automatically accelerating the vehicle from the intermediate speed value to the final speed value at an acceleration rate based on the derived acceleration rate.

2. The method of claim 1, wherein the initial speed value is zero.

3. The method of claim 1, wherein calculating the derived acceleration rate comprises setting the derived acceleration rate to a minimum acceleration rate value if the measured acceleration rate is less than the minimum acceleration rate value.

4. The method of claim 1, wherein calculating the derived acceleration rate comprises setting the derived acceleration rate to a maximum acceleration rate value if the measured acceleration rate is greater than the maximum acceleration rate value.

5. The method of claim 1, wherein determining the measured acceleration rate comprises determining an average acceleration rate of the vehicle between the initial speed value and the intermediate speed value.

6. The method of claim 1, wherein determining the measured acceleration rate comprises determining an average acceleration rate of the vehicle between a threshold speed of the intermediate speed value and the intermediate speed value.

7. The method of claim 1, wherein determining the measured acceleration rate comprises measuring an acceleration rate of the vehicle when the vehicle speed is at the intermediate speed value.

8. The method of claim 1, wherein an acceleration of the vehicle between the initial speed value and the intermediate speed value is controlled by an operator of the vehicle.

9. The method of claim 1, wherein an acceleration of the vehicle between the intermediate speed value and the final speed value is controlled by a controller in the vehicle.

10. A cruise control system for a vehicle, comprising:
    a throttle;
    a vehicle speed sensor;
    an enable input operative to receive a resume command; and
    a controller, in communication with the throttle, the vehicle speed sensor and the enable input, operative to:
        determine a measured acceleration rate of the vehicle while a vehicle speed is below an intermediate speed value and prior to receiving the resume command from an operator to automatically accelerate the vehicle from the intermediate speed value to a final speed value, wherein the intermediate speed value is greater than an initial speed value and less than the final speed value;
        receive the resume command from an operator to maintain the speed of the vehicle at the final speed value, wherein the resume command is received when the vehicle speed is equal to or greater than the intermediate speed value and wherein the resume command is indicative of an instruction to commence automatically accelerating the vehicle from the intermediate speed value to the final speed value;
        calculate a derived acceleration rate from the measured acceleration rate;
        determine that a speed of the vehicle is equal to or greater than the intermediate speed value; and
        automatically transmit an acceleration signal to the throttle to accelerate the vehicle from the intermediate speed value to the final speed value at an acceleration rate based on the derived acceleration rate.

11. The system of claim 10, wherein the initial speed value is zero.

12. The system of claim 10, wherein calculating the derived acceleration rate comprises setting the derived acceleration rate to a minimum acceleration rate value if the measured acceleration rate is less than the minimum acceleration rate value.

13. The system of claim 10, wherein calculating the derived acceleration rate comprises setting the derived acceleration rate to a maximum acceleration rate value if the measured acceleration rate is greater than the maximum acceleration rate value.

14. The system of claim 10, wherein determining the measured acceleration rate comprises determining an average acceleration rate of the vehicle between the initial speed value and the intermediate speed value.

15. The system of claim 10, wherein determining the measured acceleration rate comprises determining an average acceleration rate of the vehicle between a threshold speed of the intermediate speed value and the intermediate speed value.

16. The system of claim 10, wherein determining the measured acceleration rate comprises measuring an acceleration rate of the vehicle when the vehicle speed is at the intermediate speed value.

17. The system of claim 10, wherein an acceleration of the vehicle between the initial speed value and the intermediate speed value is controlled by an operator of the vehicle.

18. A vehicle, comprising:
    a prime mover;
    a transmission operative to couple power from the prime mover to a transmission output at a plurality of different gear ratios;

a throttle, operative to control a rotational speed of the prime mover;

a vehicle speed sensor;

an enable input operative to receive a resume command; and a controller, in communication with the throttle, the vehicle speed sensor and the enable input, operative to:

select a gear ratio of the transmission;

determine a measured acceleration rate of the vehicle while a vehicle speed is below an intermediate speed value and prior to receiving the resume command from an operator to automatically accelerate the vehicle from the intermediate speed value to a final speed value, wherein the intermediate speed value is greater than an initial speed value and less than the final speed value;

receive the resume command from an operator to maintain the speed of the vehicle at the final speed value, wherein the resume command is received when the vehicle speed is equal to or greater than the intermediate speed value and wherein the resume command is indicative of an instruction to commence automatically accelerating the vehicle from the intermediate speed value to the final speed value;

calculate a derived acceleration rate from the measured acceleration rate;

determine that a speed of the vehicle is equal to or greater than the intermediate speed value; and transmit an acceleration signal to the throttle to accelerate the vehicle from the intermediate speed value to the final speed value at an acceleration rate based on the derived acceleration rate.

19. The vehicle of claim 18, wherein calculating the derived acceleration rate comprises setting the derived acceleration rate to a minimum acceleration rate value if the measured acceleration rate is less than the minimum acceleration rate value.

20. The vehicle of claim 18, wherein calculating the derived acceleration rate comprises setting the derived acceleration rate to a maximum acceleration rate value if the measured acceleration rate is greater than the maximum acceleration rate value.

* * * * *